United States Patent [19]

Le Devehat

[11] Patent Number: 5,113,895
[45] Date of Patent: May 19, 1992

[54] THREE WAY VALVE AND DISTRIBUTION PIPE COMPRISING SAME, BOTH ADAPTED TO BE CLEANED BY SCRAPING

[75] Inventor: Eugene Le Devehat, Saligny, France

[73] Assignee: FMC Corporation, Chicago, Ill.

[21] Appl. No.: 454,103

[22] Filed: Dec. 20, 1989

[30] Foreign Application Priority Data

Dec. 20, 1988 [FR] France .................. 88 16846

[51] Int. Cl.⁵ .................................. B08B 9/04
[52] U.S. Cl. ........................ 137/244; 15/3.5; 137/883
[58] Field of Search .......... 15/3.5, 3.51, 104.06; 137/242, 244, 263, 883, 594, 887, 255, 265; 222/148; 251/315

[56] References Cited

U.S. PATENT DOCUMENTS

| | | | |
|---|---|---|---|
| 1,049,012 | 12/1912 | Weber et al. | 15/3.51 |
| 2,085,453 | 6/1937 | Schaer | 15/3.51 |
| 2,095,823 | 10/1937 | Marshall | 15/3.51 |
| 2,177,429 | 10/1939 | Foster | 15/3.51 |
| 2,363,177 | 11/1944 | Haffner | 137/263 |
| 2,948,143 | 8/1960 | Pruitt | 15/3.51 |
| 3,001,543 | 9/1961 | Barton et al. | 137/242 |
| 3,228,611 | 1/1966 | Russell | 15/3.5 |
| 3,266,076 | 8/1966 | Surber | 15/104.062 |
| 3,516,638 | 6/1970 | Piggott | 251/315 |
| 3,562,014 | 2/1971 | Childers et al. | 15/104.062 |
| 3,591,131 | 7/1971 | Carlson | 251/315 |
| 3,676,091 | 7/1972 | Fraser et al. | 48/190 |
| 3,778,029 | 12/1973 | Baker | 251/315 |
| 4,196,752 | 4/1980 | Niskanen | 137/887 |
| 4,467,826 | 8/1984 | Lorentz | 137/263 |
| 4,574,830 | 3/1986 | Rickey et al. | 15/3.51 |
| 4,890,648 | 1/1990 | Giordano | 137/887 |
| 4,915,133 | 4/1990 | Harrison | 251/315 |

FOREIGN PATENT DOCUMENTS

| | | |
|---|---|---|
| 3512163 | 10/1986 | Fed. Rep. of Germany . |
| 3517751 | 11/1986 | Fed. Rep. of Germany . |
| 2222587 | 3/1974 | France . |
| 2605253 | 10/1986 | France . |
| 945551 | 7/1982 | U.S.S.R. . |
| 2026647 | 5/1979 | United Kingdom . |

Primary Examiner—George L. Walton
Attorney, Agent, or Firm—W. William Ritt, Jr.; Richard B. Megley

[57] ABSTRACT

A three-way ball valve adapted for connection to a liquid distribution pipe with a pipe cleaning device therein, the valve including a spherical closure element that is located with respect to the pipe to minimize deposition and accumulation of residues in said pipe and to facilitate removal of said residues by movement of said cleaning device past said closure element.

6 Claims, 6 Drawing Sheets

FIG_2

FIG_3

THREE WAY VALVE AND DISTRIBUTION PIPE COMPRISING SAME, BOTH ADAPTED TO BE CLEANED BY SCRAPING

The present invention concerns a three-way valve for a liquid distribution pipe, for example a pipe for distributing oil or petroleum products, which pipe is adapted to be cleaned by scraping.

If the same pipe is used to distribute several liquids in succession and it is required to change liquid, after shutting off the supply of the first liquid at the upstream end of the pipe and before establishing the supply of the next liquid, also at the upstream end of the pipe, it is known practice to circulate in the pipe from the upstream to the downstream end and vice versa a "captive" scraper to sweep the interior wall of the pipe and discharge to the downstream end residues of the first liquid adhering to this interior wall. This avoids cross-pollution or contamination of the successive liquids. The scraper is "captive" in that it is intended to make a number of to-and-fro movements in the pipe or pipes without being able to escape therefrom under normal conditions.

This is described in particular in the document FR-2.222.587.

Three-way valves designed to be fitted in liquid distribution pipes of this kind must therefore be adapted to have a scraper pass through them, which imposes a number of constraints on the geometry of the valve.

In practice known three-way valves comprise a main section adapted to have a scraper pass through it and a branch section connected at right angles to the main section so as to form a Tee.

In the document FR-2.222.587 the three-channel valve adapted to be cleaned by scraping used in the liquid distribution pipe comprises a slider movable along the main section to close off selectively the branch section and adapted to cover or expose an annular slot formed in the inside wall of the main section.

A solution of this kind is found to have disadvantages due in particular to the fact that the scraper cannot remove residue from the radial thickness of the housing for the aforementioned annular slot or near the slider. This geometry results in corners and dead ends to which access is difficult and where detritus accumulates without it being really possible to wash it out by means of the fluid. Three-way valves adapted to be cleaned by scraping generally feature dead areas and/or generate at the junction of the main and branch sections strong turbulence producing significant head losses. Finally, it is not possible to direct a scraper into the branch section as far as the immediate vicinity of the main section should this be necessary.

Furthermore, in known liquid distribution pipes valves of very different kinds are provided, at the upstream end for storing scrapers when they are not being used for scraping and at the downstream end for the fluid inlet and outlet branches of the pipe.

An object of the invention is to overcome the aforementioned disadvantages by proposing a three-way valve adapted to prevent the deposition of any significant quantity of non-scrapable residues and which produces very low head losses.

The invention complementarily proposes a three-way valve adapted to be used as a valve for supplying and storing and launching scrapers and, subject to simple modifications, as an actual three-way valve constituting a branch in the liquid distribution pipe.

To this end the invention proposes a three-way valve for a liquid distribution pipe where said valve and said pipe are adapted to be cleaned by scraping, the valve comprising a main section adapted to be connected to the distribution pipe, a branch section adapted to be connected to an inlet/outlet pipe communicating with the main section through an opening in the wall of the main section and a mobile obturator member adapted to shut off selectively the opening, characterised in that the opening is entirely contained within the extension of the internal volume of the branch section and in that the obturator member, which is situated between the branch section and the opening, comprises a spherical plug through which passes a cylindrical bore and which is adapted to rotate through at least 90° about an axis Z—Z transverse to the axis Y—Y of the branch section between an open configuration in which the bore is aligned with the branch section and a closed configuration in which said bore is transverse to the branch section and the spherical external surface of the spherical plug is at least approximately tangential to the internal volume of the main section.

In preferred embodiments of the invention:

the opening is approximately rectangular with rounded corners the larger dimension of which, hereinafter referred to as its length, is parallel to the main section whereas its other dimension, hereinafter referred to as its width, is transverse to both sections;

the ratio of the length of the opening to its width is between 1.3 and 1.4 and the length is between 80 and 95% of the inside diameter of the main section;

the cylindrical bore has an inside diameter equal to that of the branch section which is in turn equal to that of the main section;

the transverse axis of the spherical plug is perpendicular to the axes of the main section and the branch section;

the valve comprises a retractable stop member adapted to be selectively inserted into the internal volume of the main section in approximate alignment with the branch section so as to be able to intercept a scraper or retracted from said internal volume so that a scraper can pass by it;

the retractable stop member is adapted to intersect the internal volume of the main section on a plane transverse to the main section and containing the axis of the branch section;

the retractable stop member comprises a finger adapted to be inserted radially into and retracted radially from the internal volume of the main section;

the finger is adapted to pass diametrally across the internal volume and engage in a blind hole formed in the wall of the main section;

the finger is the rod of a double-acting ram;

the finger is movable transversely to the axes of the main section and the branch section;

said transverse axis of the spherical plug is parallel to the axis of the main section;

an orifice for injecting fluid under pressure is provided through the wall of the main section;

an obturator flange is fixed to one end of the main section and comprises a cup adapted to receive in abutting relationship a scraper so that the latter is disposed between the opening and said obturator flange, an orifice for injecting fluid under pressure being provided through said obturator flange.

The invention also proposes a liquid distribution pipe adapted to have a scraper pass through it and comprising a three-way inlet valve adapted to be connected to a supply pipe and at least two three-way branch valves adapted to be connected to branch pipes, the inlet valve and some at least of the branch valves, with the exception of at most that furthest downstream, comprising a retractable stop member and the inlet valve comprising an obturator flange provided with an orifice for injecting fluid under pressure and incorporating a cup adapted to receive a scraper in abutting relationship.

Objects, characteristics and advantages of the invention will emerge from the following description given by way of non-limiting example with reference to the appended drawings in which.

The three-way valve 1 (FIGS. 1 and 2) comprises a tubular main section 2 provided at its end with two transverse flanges 3 and 4 together with a tubular branch section 5 provided with connecting flanges 6 and 7 and joining the main section 2 at right angles. The sections 2 and 5 have the same internal cross-section.

Figure 1:
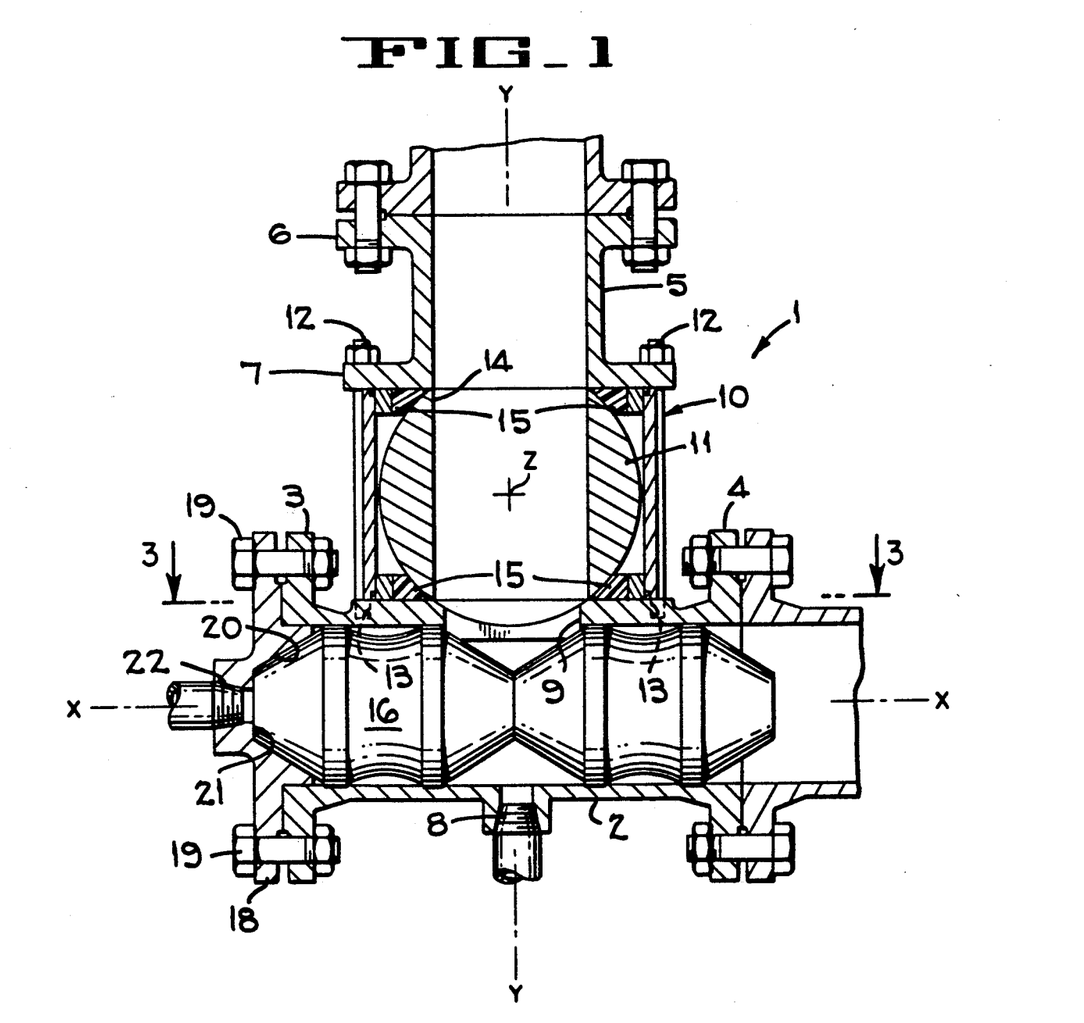
FIG. 1 is a view in axial cross-section of a three-way valve in accordance with the invention fitted with an obturator flange and usable as a scraper supply, storage and launch valve.
Figure 2:
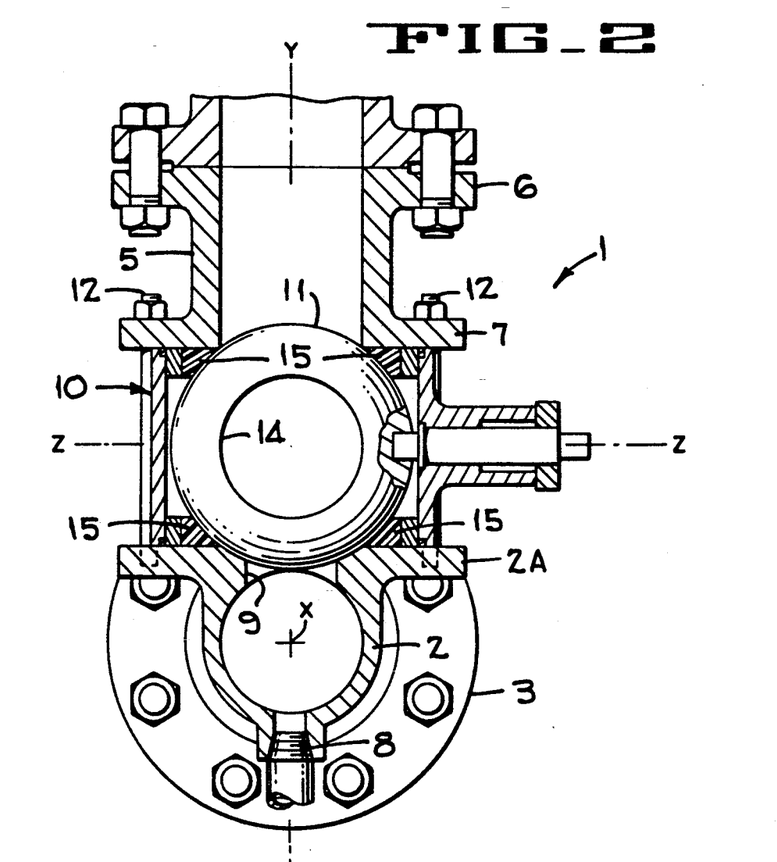
FIG. 2 is a view of it in a closed configuration and seen in transverse cross-section on a plane transverse to the axis of the main section and containing the axis of the branch section.

In the inside wall of the main section 2, substantially half-way along its length, is an orifice 8 adapted to be connected to a compressed air supply (or any other appropriate pressurised fluid supply) and also, in a longitudinal plane flange 2A extending along this wall, an opening 9 adapted to provide communication between the interior of the main section 2 and the interior of the branch section 5.

The opening 9 is entirely contained within the extension of the internal volume of the branch section 5; its lateral wall therefore has a small surface area which enables only a small quantity of liquid residues to adhere.

Figure 3:
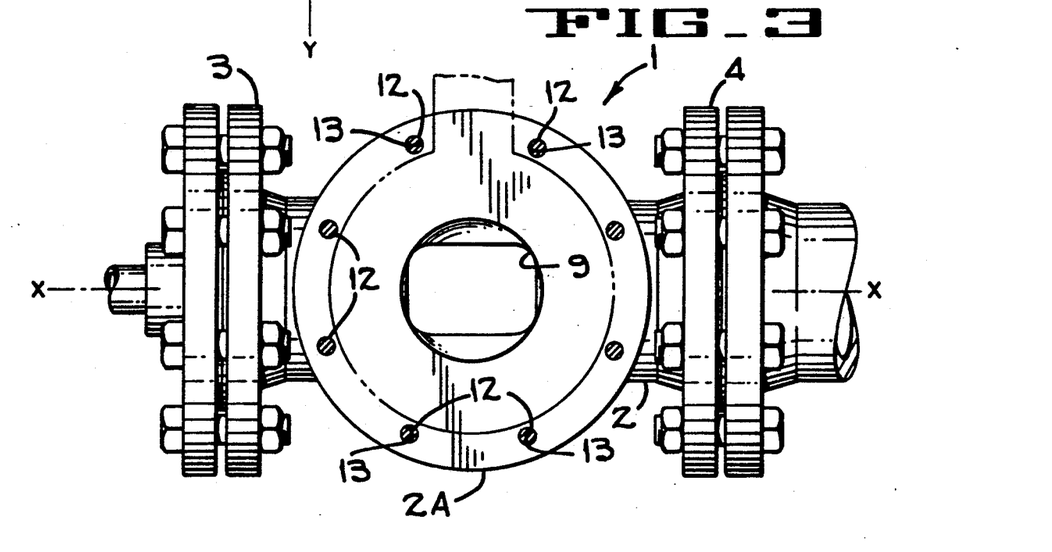
FIG. 3 is a view of it in cross-section on the line 3—3 in FIGS. 1 and 2.

The opening 9 is shown from above in FIG. 3. In this preferred embodiment it is approximately rectangular with rounded corners and its larger dimension is aligned with the axis X—X of the main section. The length/width ratio has a value of approximately 1.35 (between 1.3 and 1.4), for example, and the length has a value of approximately 90% (between 80 and 95%) of the inside diameter of the mainsection.

The flow cross-section of the opening 9 is preferably at least ⅔ that of the nominal cross-section of the branch section and advantageously in the vicinity of 66 or 75% thereof.

Between the main section 2 and the branch section 5 is an obturator member 10 with a spherical plug 11. The obturator member 10 is fixed into the three-way valve 1 by means of long bolts 12 passing through holes in the flange 7 of the branch section 5 and entering bores 13 provided in the longitudinal plane flange of the main section 2.

As seen particularly clearly in FIG. 2 the spherical plug 11 of the obturator member 10 is adapted to turn through at least 90° about an axis Z—Z perpendicular to the axis Y—Y of the branch section.

In the spherical plug 11 is a cylindrical bore 14 with the same internal cross-section as the branch section 5. The spherical plug 11 has an open position in which the cylindrical bore 14 is aligned with the branch section 5 and enables the latter to communicate with the interior of the main section 2 through the orifice 9 and a closed position in which the cylindrical bore 14 is at right angles to the axis X—X as a consequence of which flow is prevented between the branch section 5 and the main section 2.

Seals 15 are provided to prevent leaks at the periphery of the spherical plug.

Note that the volume swept out by the spherical plug as it rotates is substantially tangential to the extension of the internal surface of the main section so that in the obturation position the spherical plug occupies virtually all the orifice 9 without being in a position to impede the through movement of a scraper 16.

The only surface likely to be soiled by liquid residues that cannot be scraped clean is therefore the narrow wall bordering the flow opening 9. It will be understood that the branch section 5 and the bore 14 in the spherical plug can be scraped clean if necessary.

Figure 5:
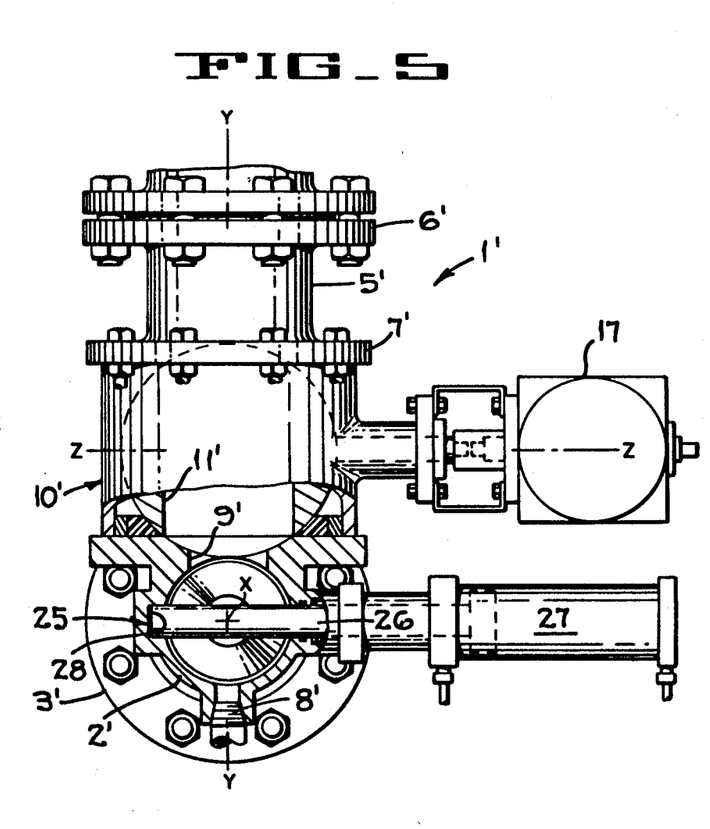
FIG. 5 is a view of it in axial cross-section analogous to that of FIG. 2.

The obturator member 10 with its spherical plug 11 is associated with any appropriate known type pneumatic control means (not shown in FIG. 2, item 17 in FIG. 5). The rotation axis of the spherical plug is transverse to the axis Y—Y of the branch section and to the axis X—X of the main section.

In the arrangement shown in FIGS. 1 and 2 the spherical plug valve 1 is closed at one end of its main section by a flange 18 attached by fixing means (in this instance bolts) 19 to the flange 3. A flange formed at the end of a pipe is connected to the flange 4. The obturator flange 18 includes a cup 20 of frustoconical shape designed to receive in abutting relationship a scraper 16 the end of which is also frustoconical in shape. Through the bottom 21 of the cup is an orifice 22 adapted to be connected to a pressure source, for example a compressed air supply (not shown) which may be the same as that connected to the orifice 8, for example.

In the embodiment shown in FIG. 1 the axis Y—Y and the obturator flange 18 are offset axially along the axis X—X by a distance such that the forward end of the scraper 16 lies on the axis Y—Y which enables liquid to flow and prevents the scraper being entrained by any flow from the branch section 5 towards the open end of the main section 2.

Figure 4:
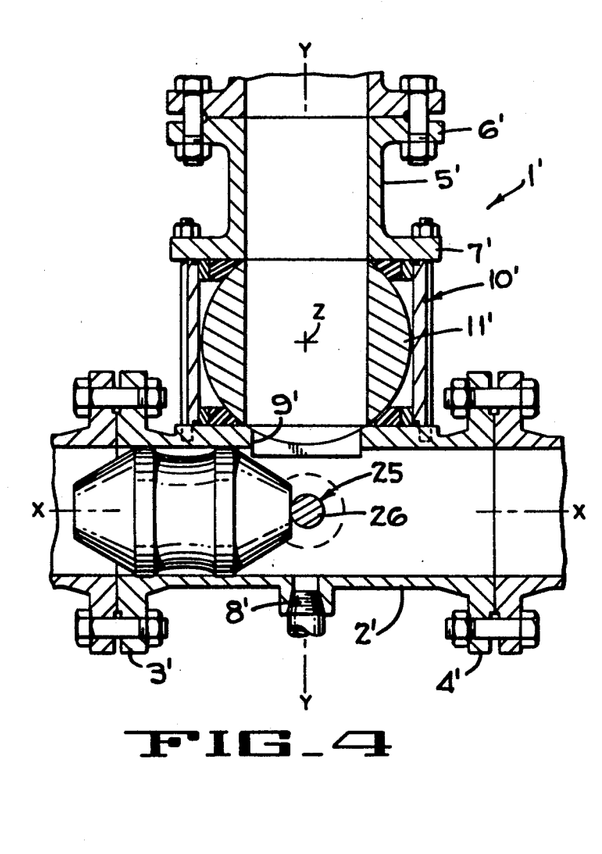
FIG. 4 is a view in axial cross-section of another three-way valve in accordance with the invention fitted with a stop member and usable as a branch valve.

FIGS. 4 and 5 show a different three-way valve 1' component parts of which that are similar to those of FIGS. 1 through 3 being assigned the same reference symbols except that they are "primed".

Like the valve 1 in FIGS. 1 and 2 the valve 1' comprises a main section 2' provided with flanges 3' and 4', a branch section 5' provided with flanges 6' and 7' and an obturator member 10' with a spherical plug 11'. The flanges 3' and 4' are connected to flanges on other pipe sections.

In the wall of the main section 2' is an orifice 8' for injecting compressed air (not mandatory) and a flow orifice 9'.

In the example of FIGS. 4 and 5 there is further provided a retractable stop member 25 in the form of a finger 26 adapted to intersect radially the main section 2' substantially at the intersection of the axes X—X and Y—Y. It is designed to block movement of the scraper 16 in one direction or the other, should this be necessary. To be more precise the finger is adapted to pass through the internal volume of the main section and enter a blind hole 28 contributing to fixing it in position.

The finger 26 constituting the retractable stop member 25 is radially retractable. It is the piston rod of a double-acting hydraulic or pneumatic ram 27 adapted to be connected to an appropriate pressure source.

It will be understood that the valves 1 and 1' are very similar, differing only in the presence of the stop member 25. In a preferred embodiment (not shown) of the valve 1 diametrally opposed blind holes are formed in a plane transverse to the axis X—X and containing the axis Y—Y; it is then sufficient to drill out one of these blind holes to fit a stop member and so convert a valve which is of the valve 1 type to a valve which is of the valve 1' type. This reduces manufacturing costs since the valves 1 and 1' have very similar manufacturing processes; furthermore, if this embodiment of the valve 1 is used storage is simplified if the stop member is not fitted until the valve is incorporated into a pipe since prior to this the valves 1' and the valves 1 in this preferred embodiment are identical.

FIGS. 6 through 10 show an application of the valve of FIGS. 1 through 5 and represent five phases in the functioning of a liquid distribution pipe 29 running from a supply pipe 30 to a selected one of several storage tanks 31, 32, 33. The pipe 29 includes a three-way inlet or supply valve 34 at which the supply pipe 30 terminates and from which a common pipe 35 runs. Three branch valves 36 (36A, 36B and 36C) are provided at the downstream end of the pipe 35, the end opposite the inlet valve 34.

Each of the branch valves 36 communicates by a branch pipe 37, 38 or 39 with one of the storage tanks 31 through 33.

The pipe 29 is scraped clean using two scrapers 16A and 16B.

One advantage of the invention is that the valves 34 and 36 are substantially identical and differ virtually only in terms of how they are fitted into the pipe 29. The only requirement in respect of the valves 36 is that they are of the aforementioned type with the retractable stop member, which requirement does not apply to the valve 34.

In a preferred arrangement the valves 34 and 36 are respectively identical to the valves 1 and 1', the members 27 being shown in line with the pipe sections 37, 38 and 39 only to clarify the drawing. In an alternative arrangement (not shown) the valve 34 is of the valve 1' type but the stop member is not used.

In the rest configuration (FIG. 4) the four valves 34 and 36 are closed and the two scrapers 16A and 16B are located in the valve 34 (see also FIG. 1) butted up against each other and against the obturator flange 40 (similar to the flange 18 in FIG. 1) which shuts off the main section of the valve 34 at the end opposite the pipe 35. An obturator flange 41 of the same type is provided at the other end of the pipe 29, fixed to a flange of the branch valve 36C at the most downstream point on the pipe 29.

Figures 7, 8:
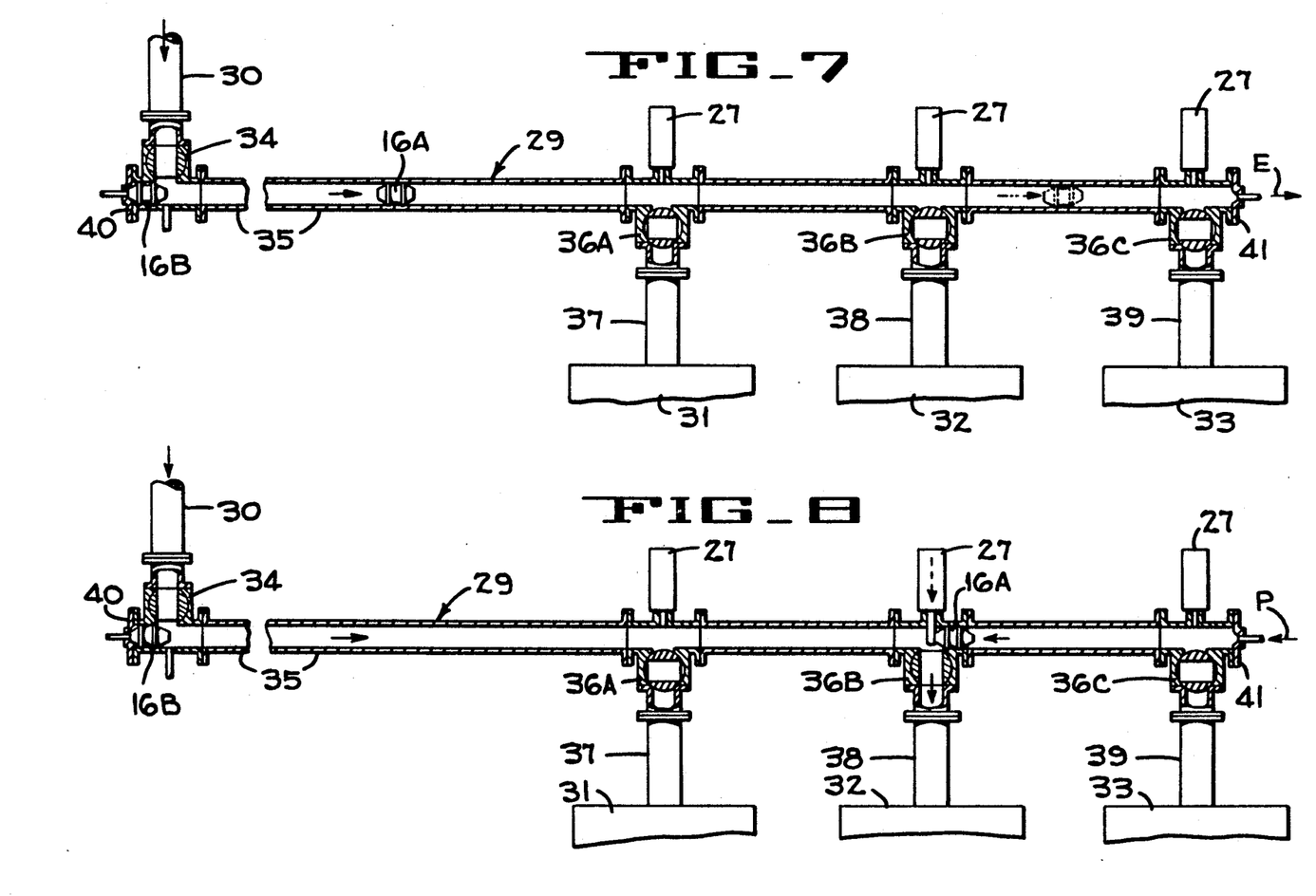
FIG. 7 is a similar view of this pipe at the start of injecting a liquid into the pipe.
FIG. 8 is a similar view of the same pipe in which the liquid is being distributed to a predetermined one of the storage tanks.

After establishing communication between the supply pipe 30 and a first liquid supply the inlet valve 34 is opened and as shown in FIG. 7 the first scraper 16A is therefore propelled towards the right by the liquid itself. To avoid impeding the advance of the scraper 16A the pipe 29 is vented to atmosphere at E through the obturator flange 1 by means of an orifice similar to the orifice 22 in FIG. 1.

The scraper is moved in this way beyond the valve 36B associated with the storage tank into which the liquid is to be fed (in this instance the storage tank 32).

Figure 6:
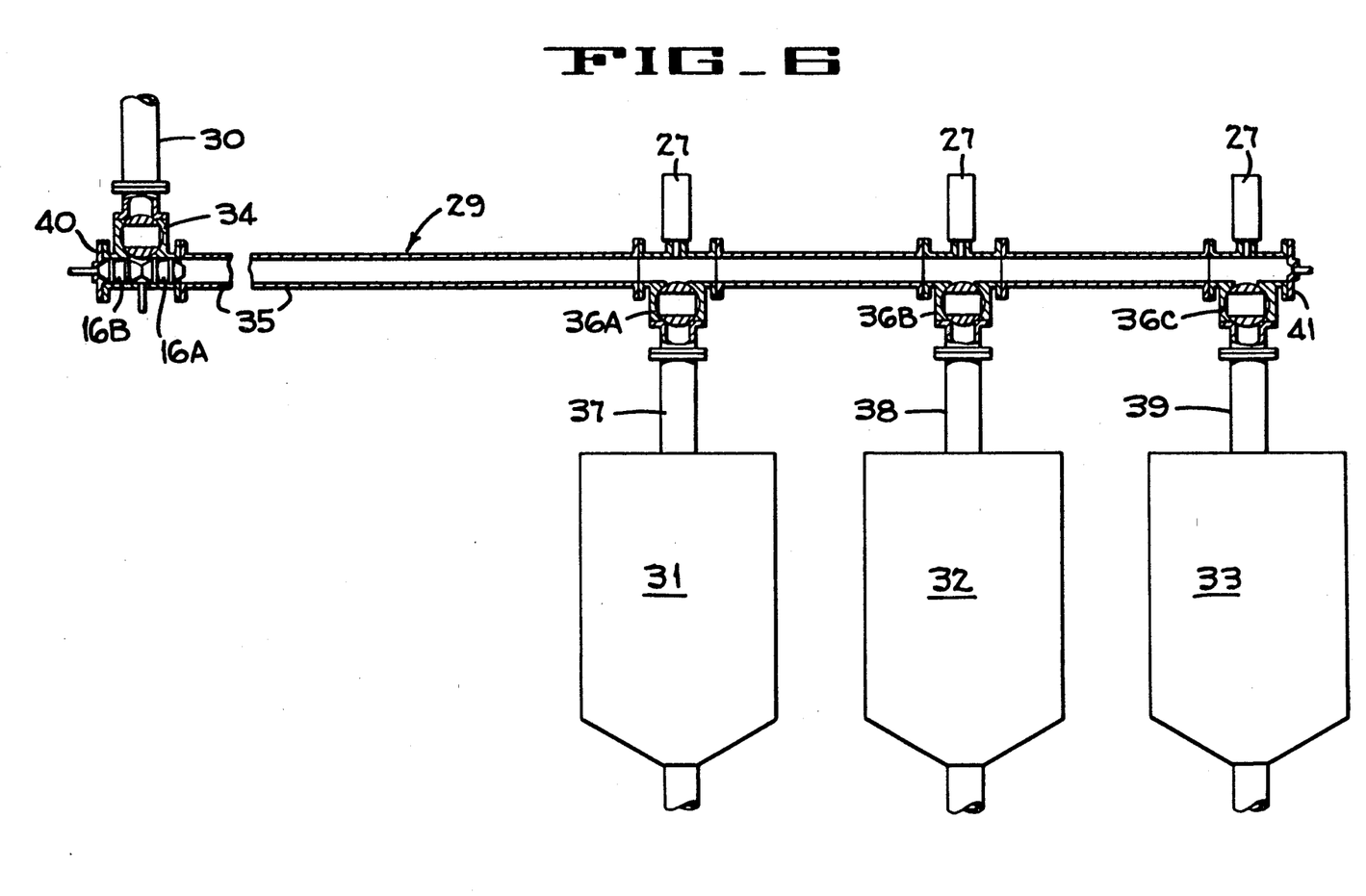
FIG. 6 is a schematic corresponding to a rest configuration of a liquid distribution conduit for distributing liquids into a number of separate storage tanks from a common supply pipe.

By injecting compressed air through the flange 41 the pipe to the right of the scraper 16A is pressurised to a pressure P. As the retractable stop device of the valve 36 has been deployed the scraper 16A is held in abutting engagement against this retractable stop member which, once the valve 36B has been opened, forces the liquid to be diverted into the section 38 leading to the storage tank 32 (FIG. 6).

Figure 9:
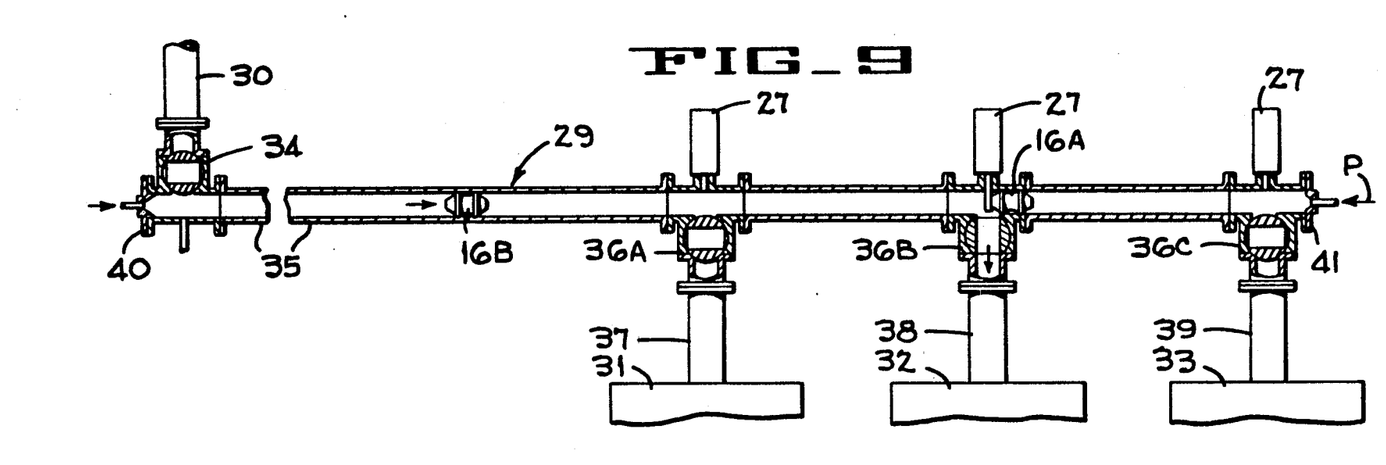
FIG. 9 is a view of this pipe at the end of injecting the liquid.
Figure 10:
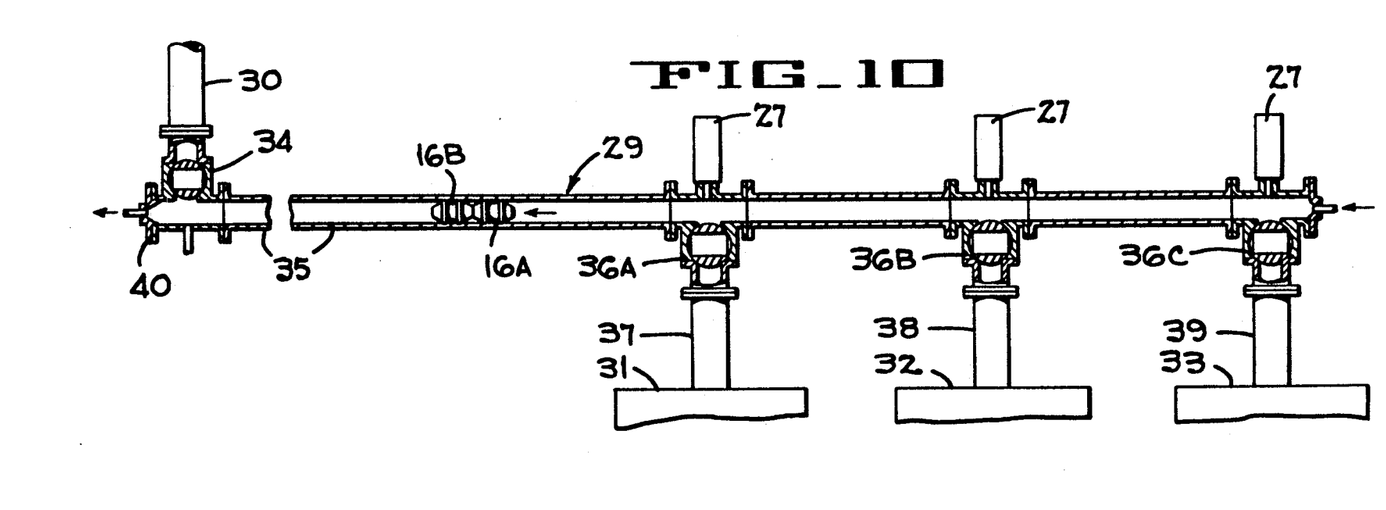
FIG. 10 is a view of this pipe towards the end of the scraping operation.

When the required quantity of liquid has been supplied through the pipe 29 the valve 34 is closed and the compressed air pressure P is applied through the flange 40 associated with the inlet valve 34 so that the liquid residue is discharged into the storage tank 32 by the second scraper 16B (FIG. 9).

When all the liquid has been discharged into the appropriate storage tank the two scrapers 16A and 16B are virtually in contact with each other, one on each side of the retractable stop device. The valve 36B is closed and the retractable stop device is retracted. By applying compressed air again through the obturator flange 41 the scrapers 16A and 16B are moved back together towards the inlet valve 34, so returning them to the FIG. 4 configuration.

In an alternative arrangement (not shown) the most downstream valve 36C connected to the pipe section 39 is of the FIG. 1 type, with no retractable stop device.

It is obvious that the preceding description has been given by way of non-limiting example only and that numerous variations thereon may be proposed by those skilled in the art without departing from the scope of the invention.

I claim:

1. A three-way ball valve adapted for connection to a liquid distribution pipe with a pipe cleaning device therein, said valve comprising:
   a) a valve body having a straight flow passage with an inner surface defined by a tubular wall for connecting said body to said distribution pipe, an inlet to and an outlet from said straight flow passage, and a branch flow passage intersecting said straight flow passage through an opening in said tubular wall between said inlet and outlet;
   b) a valve closure element housing through which the branch flow passage extends; and
   c) a ball valve closure element in said housing for controlling flow through said branch flow passage, said closure element having a spherical external surface and a cylindrical bore, said closure element located such that its spherical external surface is substantially tangential to said inner surface of said straight flow passage at said opening when said closure element is in its closed position to minimize deposition and accumulation of residues in said straight flow passage and to facilitate removal of said residues across said spherical external surface at said opening by movement of said pipe cleaning device through said liquid distribution pipe and said straight flow passage.

2. A valve according to claim 1 wherein said tubular wall opening is of generally rectangular configuration with rounded corners, and wherein the length of said opening is parallel to the straight flow passage axis and the width of said opening is transverse to both straight and branch flow passage axes.

3. A valve according to claim 2 wherein the ratio of the length of the opening to that of its width is between 1.3 and 1.4, and the length is between 80 to 90 percent of the diameter of the straight flow passage.

4. A valve according to claim 1 including a retractable stop member for insertion into the straight flow passage in substantial alignment with the branch flow passage to prevent movement of a pig through the straight flow passage yet facilitate fluid flow between said straight and branch flow passages.

5. A valve according to claim 1 including a receptacle at one end of the straight flow passage for receiving a pipeline pig in abutting relationship therewith, and means in the receptacle for applying fluid pressure against the pig to force it away from said receptacle.

6. A piggable pipeline for distributing liquids, said pipeline comprising a liquid distribution pipe structured to accommodate movement of a pipe cleaning device therethrough and at least one three-way ball valve, said valve comprising:
   a) a valve body having a straight flow passage with an inner surface defined by a tubular wall for connecting said body to said distribution pipe, an inlet to and an outlet from said straight flow passage, and a branch flow passage intersecting said straight flow passage through an opening in said tubular wall between said inlet and outlet;
   b) a valve closure element housing through which the branch flow passage extends; and
   c) a ball valve closure element in said housing for controlling flow through said branch flow passage, said closure element having a spherical external surface and a cylindrical bore, said closure element located such that its spherical external surface is substantially tangential to said inner surface of said straight flow passage at said opening when said closure element is in its closed position to minimize deposition and accumulation of residues in said straight flow passage and to facilitate removal of said residues across said spherical external surface at said opening by movement of said pipe cleaning device through said liquid distribution pipe and said straight flow passage.

* * * * *